Aug. 13, 1968  G. E. GRUBER  3,396,694

BIN LEVEL INDICATOR WITH SCORED DIAPHRAGM

Filed Dec. 1, 1966

INVENTOR
George E. Gruber
by McDougall, Hersh, Scott
and Ladd
Att'ys

United States Patent Office 3,396,694
Patented Aug. 13, 1968

3,396,694
BIN LEVEL INDICATOR WITH
SCORED DIAPHRAGM
George E. Gruber, Port Sanilac, Mich., assignor to
Monitor Mfg., Inc., Minden City, Mich., a corporation of Michigan
Filed Dec. 1, 1966, Ser. No. 598,479
4 Claims. (Cl. 116—114)

ABSTRACT OF THE DISCLOSURE

An indicator operable by the weight of material in a bin, said indicator comprising a housing having an open end adapted to be mounted opposite an opening in the bin, a diaphragm mounted across said open end of said housing, a control device mounted in said housing, and means connected between said diaphragm and said control device for transmitting the movement of said diaphragm to said control device, said diaphragm having a plurality of generally radial creases formed therein to render the diaphragm more sensitive to the weight of the material. The indicator preferably comprises a backing plate extending behind said diaphragm, said backing plate having a peripheral flange portion wrapped around the peripheral portion of said diaphragm, and a soft resilient O-ring compressed between said flange and the front of the peripheral portion of said diaphragm.

This invention relates to a bin level indicator of the type having a diaphragm which is actuated by the weight of the material in the bin or other receptacle, and in which the diaphragm operates a switch or other control device.

One object of the present invention is to provide a new and improved diaphragm-type bin level indicator which achieves more consistent, reproducible and accurate results than heretofore.

A further object is to provide such a new and improved bin level indicator which achieves an increased sensitivity, as well as a high degree of reliability.

Another object is to provide a new and improved bin level indicator of the foregoing character in which the diaphragm is scored or creased, generally in a radial direction, with the result that the diaphragm will resume its original position, after being loaded and then unloaded, with a high degree of consistency and reliability.

A further object is to provide such a new and improved bin level indicator in which the scored or creased diaphragm requires a reduced amount of spring return effort to restore the diaphragm to its original position.

Another object is to provide such a new and improved bin level indicator in which the reliability and sensitivity of the indicator are substantially improved, with only negligible increase in cost.

Further objects and advantages of the present invention will appear from the following description, taken with the accompanying drawings, in which.

Figure 1:
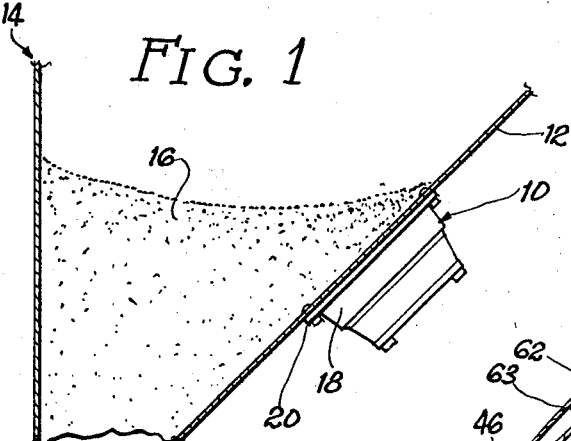
FIG. 1 is a diagrammatic elevational section showing a bin which is equipped with a bin level indicator to be described as an illustrative embodiment of the present invention.

As already indicated, FIG. 1 illustrates a bin level indicator or switching unit 10 which is mounted on one wall 12 of a bin or other receptacle 14. It will be understood that the indicator 10 is applicable to bins, conduits, tanks, hoppers, compartments, and various other receptacles or the like. While the bin level indicator 10 is particularly valuable for indicating the level of solid materials, it is also useful for liquid materials. FIG. 1 illustrates the typical situation in which the bin 14 is adapted to hold a solid material 16 which is granular, pulverulent, or otherwise flowable. Examples of such materials are grain, flour, portland cement, sand, gravel powdered chemicals and the like. The illustrated wall 12, on which the bin level indicator 10 is mounted, is inclined; but the indicator may also be used on walls which are horizontal or vertical.

The purpose of the bin level indicator 10 is to operate a signal or perform a control function in response to changes in the level of the material 16 in the bin 14. Thus, for example, the bin level indicator 10 may be adapted to operate a signal, while also stopping the in-feed conveyor for the bin, when the material rises to or above the level of the indicator, so as to prevent the material from overflowing from the bin. To cite another example, the bin level indicator may be employed to start the in-feed conveyor, or close an out-flow gate, when the material drops below the level of the indicator. Those skilled in the art will be able to devise many other applications for the bin level indicator.

Figure 4:
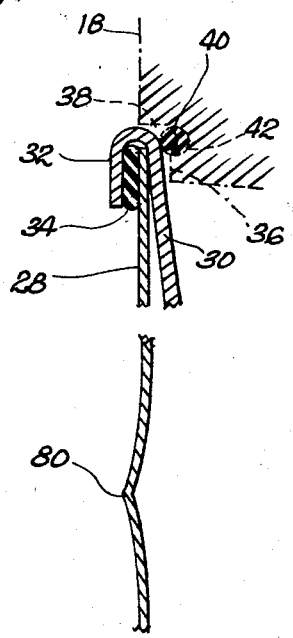
FIG. 4 is a fragmentary enlarged section, taken generally along the line 4—4 in FIG. 3.

The illustrated bin level indicator 10 comprises a housing 18 having a mounting flange 20 which is adapted to be secured to the bin wall 12 by means of bolts 22 or other suitable fasteners. A gasket 24 may be employed between the wall 12 and the mounting flange 20. It will be understood that the flange 20 is mounted around a circular opening 26 in the bin wall 12. The housing 18 has an open front or upper end 27 which is closed by a circular diaphragm 28, adapted to be actuated by the pressure of the material 16 in the bin. The illustrated diaphragm 28 is supported by a backing or mounting plate or member 30. In the illustrated construction, the diaphragm 28 is retained by a flange 32 which is formed on the periphery of the backing plate 30, as shown to best advantage in FIG. 4. The flange 32 is folded or wrapped around the peripheral portion of the diaphragm 28. A soft resilient sealing ring 34 is preferably interposed between the retaining flange 32 and the edge portion of the diaphragm 28. The sealing ring 34 may be made of natural or synthetic rubber, various plastics or other suitable materials. In its free state, the ring 34 may be circular or O-shaped in cross section, but it is flattened, as shown in FIG. 4, when the flange 32 is folded or crimped against the diaphragm 28.

As shown, the backing plate 30 is mounted against a shoulder 36 and within a recess 38 formed in the front portion of the housing 18, adjacent the mounting flange 20. A sealing ring 40 is preferably provided between the housing 18 and the peripheral portion of the backing plate 30. As shown, the sealing ring 40 is circular in cross section and is received in a curved seat or groove 42, formed in the housing 18. The sealing ring 40 may be made of natural or synthetic rubber, various plastics or other suitable materials.

Figure 2:
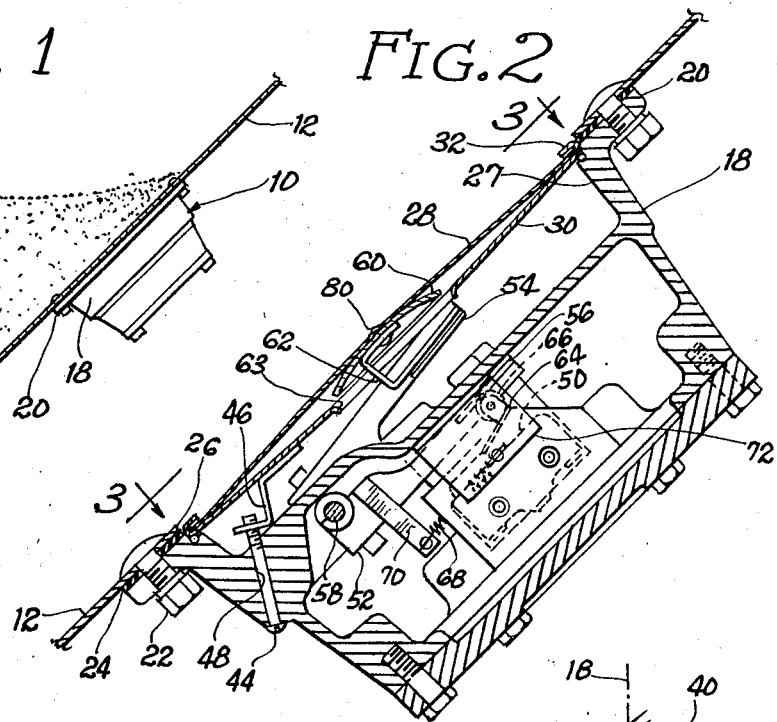
FIG. 2 is an elevational section taken through the bin level indicator of FIG. 1.
Figure 3:
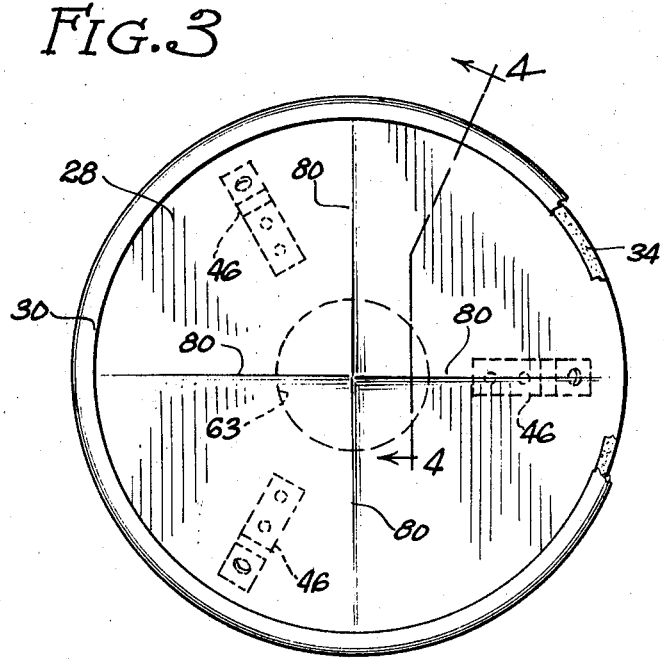
FIG. 3 is a plan view showing the diaphragm of the bin level indicator, the view being taken generally as indicated by the line 3—3 in FIG. 2.

Various means may be provided to mount the diaphragm 28 and the backing plate 30 in the housing 18. As shown, screws 44 are provided between the housing 18 and brackets 46 on the backing plate 30. The brackets 46 are suitably drilled and tapped to receive the screws 14. It will be understood that other suitable fasteners may be employed. As shown in FIG. 2, the screws 44 are inserted through inclined openings 48 which are formed in the housing 18.

In the illustrated bin level indicator 10, the diaphragm 28 is adapted to operate a switch 50 which is mounted within the housing 18. The switch 50 may be employed to operate signals, relays, motors and other electrical devices.

In the illustrated construction, the movement of the diaphragm 28 is transmitted to the switch 50 by means of a lever assembly 52, so that any substantial movement of the diaphragm 28 will operate the switch 50. The illustrated lever assembly 52 comprises two lever arms 54 and 56, both of which are secured to a pivot shaft 58 which is rotatably mounted within the housing 18. The arm 54 is provided with a curved shoe 60 for engaging the inner or rear side of the diaphragm 28. The shoe 60 is connected to the arm 54 by means of a generally U-shaped bracket 62. The shoe 60 and the bracket 62 project through a central opening 63 which is formed in the backing plate 30. As shown, the shoe 60 engages the central portion of the diaphragm 28. The curvature of the shoe 60 is generally spherical. It will be seen that the switch 50 is provided with an external operating arm 64 on which a roller 66 is mounted. The lever arm 56 is engageable with the roller 66. It will be seen that the switch 50 will be operated by any substantial rearward movement of the lever arm 56, due to rearward movement of the diaphragm 28.

The lever assembly 52 is preferably biased forwardly by means of a return spring 68 which may be of any suitable type. The illustrated spring 68 is in the form of a coiled tension spring having one end connected to a rearwardly extending member 70 on the lever arm 56. The other end of the spring 68 is connected to an anchoring bracket 72, mounted within the housing 18.

In accordance with the present invention, the diaphragm 28 is scored, creased or bent so as to form a plurality of creases or score marks 80 on the diaphragm. As shown to best advantage in FIG. 4, the creases 80 project forwardly to a slight extent, toward the material 16 in the bin 14. Thus, the creases 80 may also be characterized as forwardly projecting ridges.

The creases 80 preferably extend along lines which are radial or nearly so. In the illustrated construction, the creases 80 extend along two diametrical lines which are at right angles to each other and which extend through the center of the diaphragm 28, so as to produce four equally spaced radial creases. It will be understood that a larger or smaller number of creases may be employed.

The creases 80 may be formed very easily by scoring the rear side of the diaphragm 28. The creases 80 may also be formed by a bending, pressing or die-forming operation.

It has been found that the creases or score marks greatly improve the operation of the diaphragm 28 so that greatly improved consistency, reproducibility and accuracy are achieved. The provision of the creases greatly improves the ability of the diaphragm to return to its original position after the diaphragm has been loaded and then unloaded. Less biasing action is required to return the diaphragm to its original position. Thus, the strength of the return spring 68 may be minimized. In this way, the sensitivity of the bin level indicator may be increased substantially.

The diaphragm 28 is preferably made of thin sheet metal, although other thin materials may be employed. The diaphragm is quite thin so as to be flexible and responsive to the weight of the granular material 16.

When the level of the granular material rises above the bin level indicator 10, as shown in FIG. 2, the weight of the material flexes the diaphragm 28 rearwardly, against the resilient resistance afforded by the return spring 68. The rearward movement of the diaphragm 28 is transmitted to the operating arm of the switch 50 by the lever arms 54 and 56. The switch 50 may be arranged to operate signals, relays, solenoids, valves, motors and other control devices.

By virtue of the creases 80, the diaphragm 28 retains its basic cross sectional shape when it is flexed rearwardly. The creases 80 greatly assist in the return of the diaphragm to its initial position after the weight of the granular material has been removed from the diaphragm. Less spring pressure is required to return the diaphragm to its initial position. Thus, the provision of the radial creases 80 makes it possible to increase the sensitivity of the bin level indicator, while greatly improving the consistency, reproducibility and accuracy of the results achieved with the bin level indicator.

Various other modifications, alternative constructions, and equivalents may be employed without departing from the true spirit and scope of the invention, as exemplified in the foregoing description and defined in the following claims.

I claim:
1. An indicator adapted to be operated by the weight of material in a bin having an indicator opening therein,
   said indicator comprising the combination of a generally dish-shaped housing having an open end,
   a diaphragm extending across said open end,
   means including a mounting flange on said housing and extending around said open end for securing said housing to the bin with the diaphragm opposite the indicator opening therein,
   an electrical switch mounted in said housing,
   and linkage means mounted in said housing and connected between the central portion of said diaphragm and said switch for transmitting the movement of said diaphragm to said switch,
   said linkage means including a device for biasing said diaphragm in an outward direction,
   said diaphragm being provided with a plurality of generally radial creases forming outwardly projecting ridges on said diaphragm, to increase the response thereof.

2. An indicator according to claim 1,
   in which said diaphragm is made of thin sheet metal,
   and in which said creases are in the form of score marks in said sheet metal.

3. An indicator adapted to be operated by the weight of material in a bin having an indicator opening therein,
   said indicator comprising the combination of a housing having an open end,
   a diaphragm extending across the open end of said housing,
   means including a mounting flange portion on said housing and extending around said open end for securing said housing to the bin with the diaphragm opposite the indicator opening therein,
   a control device in said housing,
   means connected between said diaphragm and said control device for transmitting the movement of said diaphragm to said control device,
   and a backing plate mounted on said open end of said housing and extending behind said diaphragm,
   said backing plate having a peripheral flange member formed integrally therewith and wrapped around the peripheral portion of said diaphragm, the rear side of the peripheral portion of said diaphragm being engaged with said backing plate,
and a soft resilient sealing ring compressed between said peripheral flange member and the front side of said peripheral portion of said diaphragm.

4. An indicator according to claim 3,
in which said sealing ring is in the form of a circular O-ring which is compressed in position of use between said flange member and the front side of the peripheral portion of said diaphragm.

References Cited

UNITED STATES PATENTS

| 1,085,354 | 1/1914 | Mukautz | 116—142 XR |
| 1,379,803 | 5/1921 | Covert | 340—246 |
| 1,611,454 | 12/1926 | Joy | 181—32 |

FOREIGN PATENTS 776,630  11/1934  France.

LOUIS CAPOZI, *Primary Examiner.*